(12) United States Patent
Baba et al.

(10) Patent No.: US 10,679,502 B2
(45) Date of Patent: Jun. 9, 2020

(54) COLLISION AVOIDANCE APPARATUS

(71) Applicant: DENSO CORPORATION, Kariya, Aichi-pref. (JP)

(72) Inventors: Takahiro Baba, Kariya (JP); Kei Kamiya, Kariya (JP); Yosuke Ito, Kariya (JP); Takaharu Oguri, Kariya (JP); Ryo Takaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/122,102

(22) Filed: Sep. 5, 2018

(65) Prior Publication Data
US 2019/0073903 A1 Mar. 7, 2019

(30) Foreign Application Priority Data
Sep. 7, 2017 (JP) ................. 2017-172053

(51) Int. Cl.
| | |
|---|---|
| *G08G 1/16* | (2006.01) |
| *B60W 30/095* | (2012.01) |
| *B60W 50/14* | (2020.01) |
| *G01S 13/86* | (2006.01) |
| *G01S 13/931* | (2020.01) |

(Continued)

(52) U.S. Cl.
CPC ......... *G08G 1/163* (2013.01); *B60W 30/0953* (2013.01); *B60W 30/0956* (2013.01); *B60W 50/14* (2013.01); *G01S 13/86* (2013.01); *G01S 13/867* (2013.01); *G01S 13/931* (2013.01); *G08G 1/0962* (2013.01); *G08G 1/162* (2013.01); *G08G 1/166* (2013.01); *G08G 1/167* (2013.01); *G01S 2007/4039* (2013.01); *G01S 2013/932* (2020.01); *G01S 2013/9322* (2020.01); *G01S 2013/93185* (2020.01); *G01S 2013/93271* (2020.01)

(58) Field of Classification Search
CPC ......... B60W 30/0953; B60W 30/0956; B60W 50/14; G01S 13/86; G01S 13/867; G01S 13/931; G01S 2007/4039; G01S 2013/9346; G01S 2013/9353; G01S 2013/9357; G01S 2013/9375; G08G 1/0962; G08G 1/162; G08G 1/163; G08G 1/166; G08G 1/167
See application file for complete search history.

(56) References Cited

U.S. PATENT DOCUMENTS

| 10,262,534 B2* | 4/2019 | Okada | B60T 7/22 |
| 2002/0087269 A1* | 7/2002 | Sasaki | B60R 1/00 |
| | | | 701/301 |

(Continued)

*Primary Examiner* — Babar Sarwar
(74) *Attorney, Agent, or Firm* — Maschoff Brennan

(57) ABSTRACT

A collision avoidance apparatus is provided with an intersection determination unit, a dead angle determination unit, a right-left turn determination unit and a collision avoidance control unit.

The collision avoidance control unit is configured to relax, when the right-left turn determination unit determines that the own vehicle makes a right turn or a left turn and the dead angle determination unit determines presence of the dead angle region, an operational condition of a collision avoidance process compared to a case where the dead angle region is not present, in order to avoid a collision between the own vehicle and a straight-running vehicle running on the opposite lane.

12 Claims, 13 Drawing Sheets

(51) Int. Cl.
    *G08G 1/0962*     (2006.01)
    *G01S 7/40*     (2006.01)

(56) References Cited

U.S. PATENT DOCUMENTS

| | | | | |
|---|---|---|---|---|
| 2009/0326796 | A1* | 12/2009 | Prokhorov | G08G 1/161 |
| | | | | 701/532 |
| 2010/0030474 | A1* | 2/2010 | Sawada | B62D 15/0265 |
| | | | | 701/301 |
| 2012/0206483 | A1* | 8/2012 | Funabashi | G08G 1/096716 |
| | | | | 345/629 |
| 2013/0261952 | A1* | 10/2013 | Aso | B60W 30/0953 |
| | | | | 701/301 |
| 2014/0195102 | A1* | 7/2014 | Nathanson | G07C 5/0808 |
| | | | | 701/31.4 |
| 2015/0035981 | A1* | 2/2015 | Otsuki | G06K 9/00818 |
| | | | | 348/148 |
| 2015/0057914 | A1* | 2/2015 | Hiramatsu | G08G 1/0129 |
| | | | | 701/117 |
| 2015/0377607 | A1* | 12/2015 | Einecke | G01B 11/026 |
| | | | | 382/104 |
| 2016/0114800 | A1* | 4/2016 | Shimizu | B60W 30/0956 |
| | | | | 701/70 |
| 2016/0116293 | A1* | 4/2016 | Grover | G01C 21/34 |
| | | | | 701/23 |
| 2016/0335892 | A1* | 11/2016 | Okada | B60T 7/22 |
| 2017/0356994 | A1* | 12/2017 | Wodrich | G01S 13/931 |
| 2018/0326995 | A1* | 11/2018 | Hiramatsu | B60W 50/10 |
| 2019/0039616 | A1* | 2/2019 | Leff Yaffe | G05D 1/0295 |
| 2019/0072666 | A1* | 3/2019 | Duque Biarge | G01S 13/931 |
| 2019/0281119 | A1* | 9/2019 | Stenneth | G08G 1/0145 |
| 2019/0339382 | A1* | 11/2019 | Hess | G01S 13/42 |

* cited by examiner

FIG.5

| OPERATIONAL CONDITIONS | DEAD ANGLE REGION IS PRESENT (RELAXED OPERATIONAL CONDITION) | NO DEAD ANGLE REGION IS PRESENT (NORMAL OPERATIONAL CONDITION) |
|---|---|---|
| CONDITION 1 (COLLISION MARGIN TIME) | T1 | T2 |
| CONDITION 2 (RELATIVE DISTANCE) | Da1,Db2 | Da2,Db2 |
| CONDITION 3 (ESTIMATED POSITION) | PR1 | PR2 |
| CONDITION 4 (SENSOR RELIABILITY) | 1 | 2 |

| | RELAXED OPERATIONAL CONDITION | NORMAL OPERATIONAL CONDITION |
|---|---|---|
| LEVEL OF COLLISION AVOIDANCE PROCESS | HIGH (BRAKE AND ALERT) | LOW (BRAKE ONLY) |

293

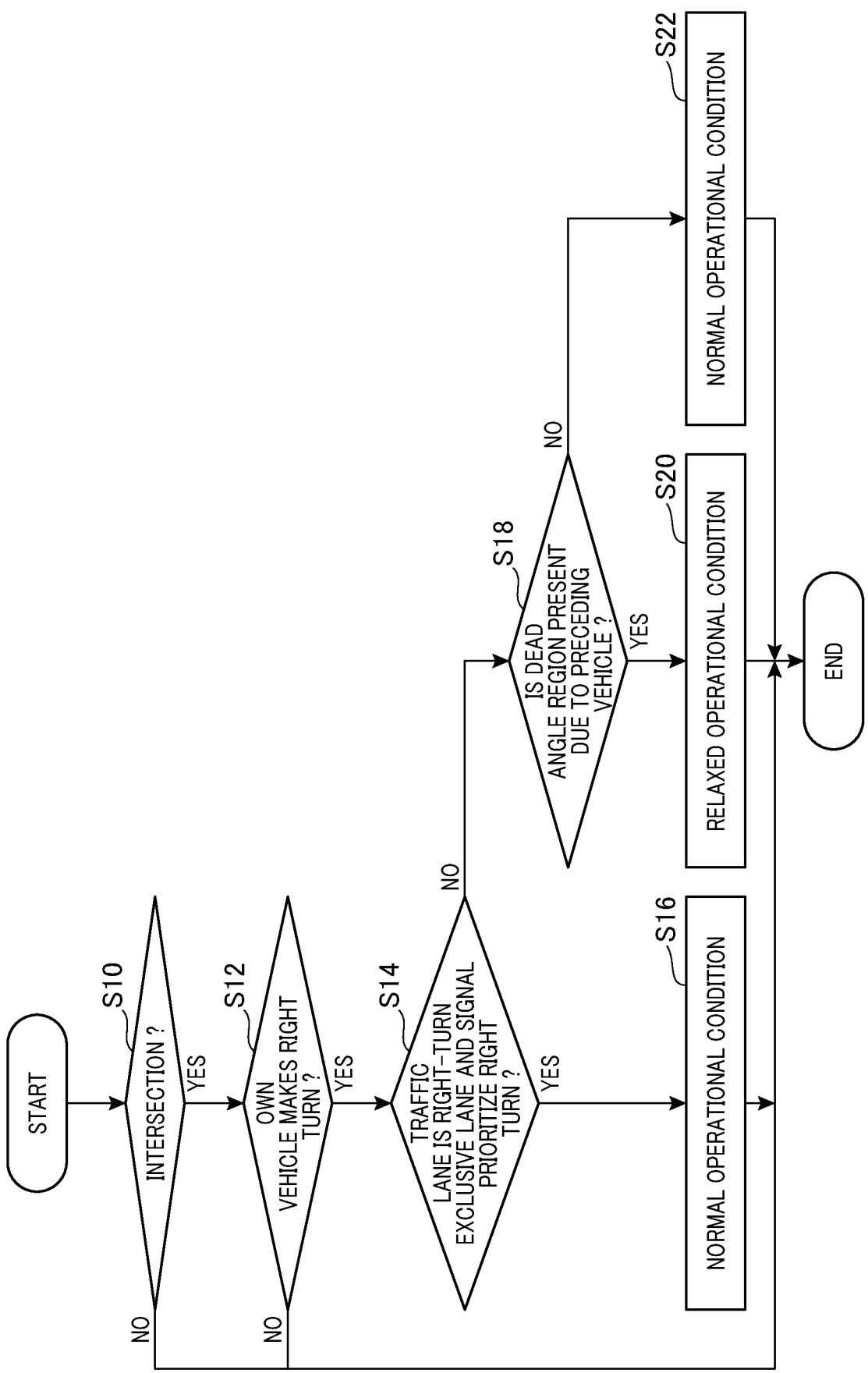

COLLISION AVOIDANCE APPARATUS

CROSS-REFERENCE TO RELATED APPLICATION

This application is based on and claims the benefit of priority from earlier Japanese Patent Application No. 2017-172053 filed Sep. 7, 2017, the description of which is incorporated herein by reference.

BACKGROUND

Technical Field

The present disclosure relates to a technique for avoiding a collision with a vehicle travelling on an opposite lane.

Description of the Related Art

A collision avoidance technique which performs a collision avoidance process is known. For example, Japanese Patent Application Laid-Open Publication Number 2015-170233 discloses such a technique in which an own vehicle and an on-coming vehicle travelling on an opposite lane are prevented from colliding when the own vehicle crosses the opposite lane to make a right turn or a left turn at an intersection. As a collision avoidance process, a braking control or a steering control or an alert process that issues an alert to the driver are known.

According to a conventional technique, a collision avoidance process is executed when a predetermined condition is satisfied in accordance with a relative distance or a relative speed between the own vehicle and the on-coming vehicle. In the case where the own vehicle crosses the opposite lane to make a right turn or a left turn at an intersection, and a collision avoidance process is executed for an on-coming vehicle (straight-running vehicle) travelling on the opposite lane, a dead angle region may be produced in a part of the opposite lane when viewed from the own vehicle depending on other vehicles such as a preceding vehicle running ahead of the own vehicle. The dead angle region may cause a detection delay in detecting the straight-running vehicle. Thus, determination whether a collision avoidance process should be executed or not may be delayed compared to a case where no dead angle region is present. A delayed determination of whether or not the collision avoidance process is executed, causes a delay in an activation timing of a collision avoidance process with respect to the correct timing required for performing the collision avoidance. Hence, a probability of collision between the own vehicle and the straight-running vehicle may increase. Thus, conventionally, it is desired to develop a technique which reduces a probability of collision between the own vehicle and the straight-running vehicle in the case where a dead angle region has occurred.

SUMMARY

The present disclosure has been achieved in light of the above-described circumstances and embodied as follows.

According to one aspect of the present disclosure, a collision avoidance apparatus mounted on an own vehicle is provided.

The collision avoidance apparatus is provided with an intersection determining unit that determines whether or not an intersection is present ahead of the own vehicle; a dead angle determination unit that determines whether or not a dead angle region when viewed from the own vehicle is present in an opposite lane existing ahead of the own vehicle, based on at least either a preceding vehicle running ahead of the own vehicle or a crossing vehicle that cuts across a traffic lane of the own vehicle from the opposite lane to make a right turn or a left turn at the intersection; a right-left turn determination unit that determines whether or not the own vehicle cuts across the opposite lane to make a right turn or a left turn at the intersection; and a collision avoidance control unit, when the right-left turn determination unit determines that the own vehicle makes a right turn or a left turn and the dead angle determination unit determines a dead angle region is present, relaxes an operational condition of a collision avoidance process compared to a case where the dead angle region is not present, in order to avoid a collision between the own vehicle and a straight-running vehicle running on the opposite lane.

According to the collision avoidance apparatus of the above-described aspect, when it is determined that a dead angle region due to the preceding vehicle or the crossing vehicle is present, an operational condition of the collision avoidance process is relaxed compared to a case where no dead angle region is determined. Thus, since a collision avoidance process can be executed considering a dead angle region, a probability of collision between the own vehicle and the straight-running vehicle can be reduced.

The present disclosure can be accomplished in various modes other than the collision avoidance apparatus. For example, the present disclosure can be embodied with a control method of a collision avoidance apparatus, a program for executing the control method, a vehicle provided with a collision avoidance apparatus, and the like.

BRIEF DESCRIPTION OF THE DRAWINGS

In the accompanying drawings:

FIG. 5 is an operational condition table describing an operational condition;

FIG. 6 is a collision avoidance table describing conditions related to the collision avoidance;

FIG. 7 is a flowchart for setting the operational conditions executed by an on-vehicle system;

DETAILED DESCRIPTION OF PREFERRED EMBODIMENTS

First Embodiment

Figure 1:
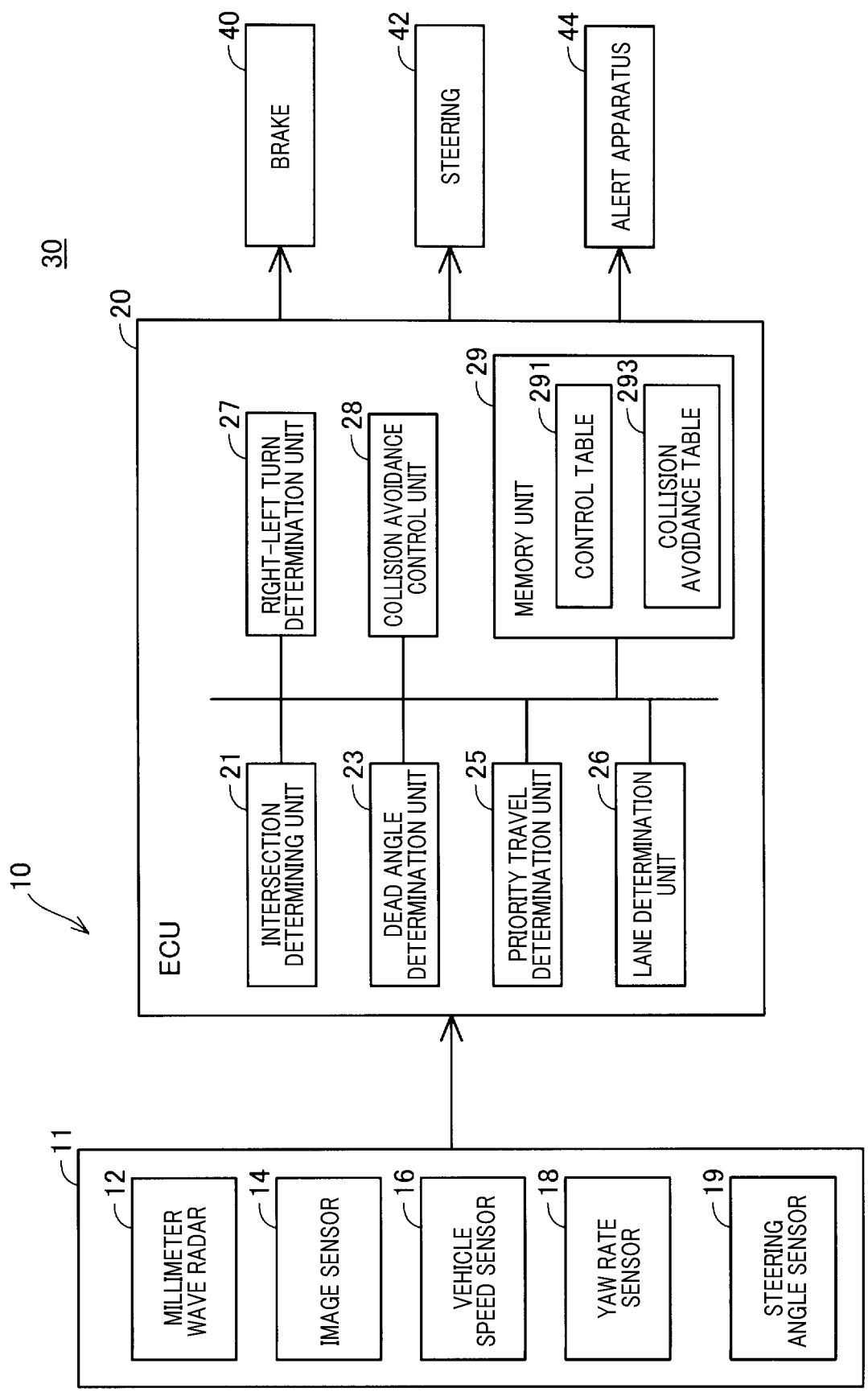
FIG. 1 is a block diagram showing an on-vehicle system according to a first embodiment of the present disclosure.
Figure 2:
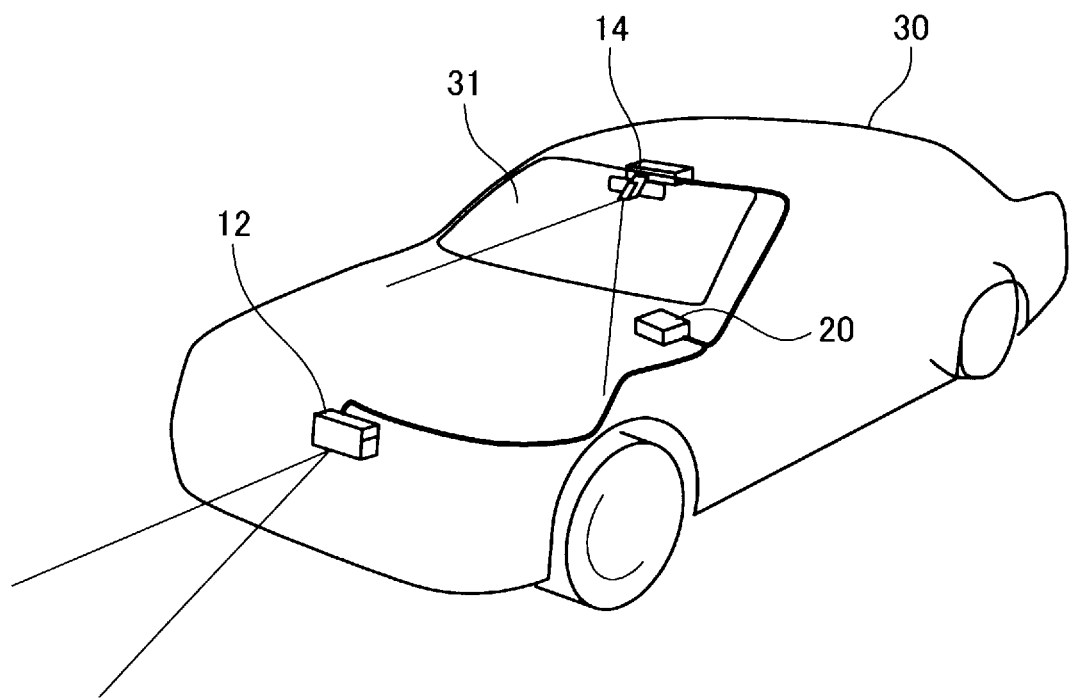
FIG. 2 is an outline drawing showing an own vehicle.

With reference to FIGS. 1 and 2, a configuration of an on-vehicle system 10 of the first embodiment which is mounted on an own vehicle 30 will be described. According to the first embodiment, the on-vehicle system 10 for a left-hand traffic in which a vehicle such as the own vehicle 30 runs on the left side on the road with respect to the center part thereof will be described. The on-vehicle system 10 serves as a collision avoidance apparatus. The on-vehicle system 10 includes a sensor unit 11 and an ECU 20. The sensor unit 11 and the ECU 20 are electrically connected via an in-vehicle network (now shown). The ECU 20 is electrically connected to a brake 40, a steering 42, an alert apparatus 44 which are included in the own vehicle 30 via in-vehicle network (not shown), and configured to control those apparatuses. The alert apparatus 44 is used to notify the driver in the own vehicle 30 of a possible collision. The alert apparatus 44 is configured of a LED lamp or a buzzer, for example.

The on-vehicle system 10 determines whether or not the own vehicle 30 will collide with other vehicle, that is, whether or not an operational condition of a collision avoidance process is satisfied, and executes a collision avoidance process when the operational condition of the collision avoidance process is satisfied.

The sensor unit 11 is provided with a millimeter wave radar 12, an image sensor 14, a vehicle speed sensor 16, a yaw rate sensor 18, and a steering angle sensor 19. The millimeter wave radar 12 is attached to a front part of the own vehicle 30. The millimeter wave radar 12 is configured as a FMCW (frequency modulated continuous wave) type radar, in which frequency-modulated millimeter wave band radar waves are transmitted/received, thereby detecting presence of an object, azimuth and distance to the object that reflects the millimeter wave band radar waves.

A transmission region to which the millimeter wave radar 12 transmits the millimeter waves is defined to include objects existing around (including front area, side area and diagonally backward area) the own vehicle 30, such as other vehicles, pedestrians, and bicycles.

The image sensor 14 is attached to a vicinity of the upper end of the front shield 31. The image sensor 14 is a camera having known configuration, capable of capturing scenery around the own vehicle. A capturing region of the image sensor 14 is defined to include objects existing around (including front area, side area and diagonally backward area) the own vehicle 30, such as other vehicles, stationary object such as road signs.

The vehicle sensor 16 (FIG. 1) detects a travelling speed of the own vehicle 30. The yaw rate sensor 17 detects a rotational angular speed of the own vehicle 30. The steering angle sensor 19 detects a steering angle of the steering of the own vehicle 30.

The ECU 20 includes a memory unit 29 and a CPU (not shown). The memory unit 29 has known configuration such as ROM and RAM. The ECU 20 includes, as program executed by the CPU, an intersection determining unit 21, a dead angle determination unit 23, a priority travel determination unit 25, a lane determination unit 26 and a right-left turn determination unit 27 and a collision avoidance control unit 28.

The intersection determining unit 21 determines whether an intersection is present ahead of the own vehicle 30 or not. Specifically, the intersection determining unit 21 performs a pattern matching for the captured image ahead of the own vehicle 30 which is captured by the image sensor 14, thereby determining whether or not an intersection is present in the captured image. The determining method executed by the intersection determining unit 21 is not limited to the above-described method, but other method may be used to determine whether or not an intersection is present. For example, the intersection determining unit 21 may determine whether an intersection is present or not, based on an object detected by the millimeter wave radar 12. Specifically, when the millimeter wave radar 12 detects a guardrail installed by a road side of the intersection, the intersection determining unit may determine that an intersection is present. The intersection determining unit 21 may determine whether or not an intersection is present based on a current location of the own vehicle 30 which is detected by a GPS (global positioning system) receiver and road information.

The dead angle determination unit 23 determines whether a dead angle region in an opposite lane ahead of the own vehicle 30 is present, when viewed from the own vehicle 30 (e.g., driver or image sensor 14). According to the present embodiment, the dead angle determination unit 23 determines whether the dead angle region is present based on a preceding vehicle running ahead of the own vehicle 30. A determination method performed by the dead angle determination unit 23 will be described with reference to FIG. 3.

Figure 3:
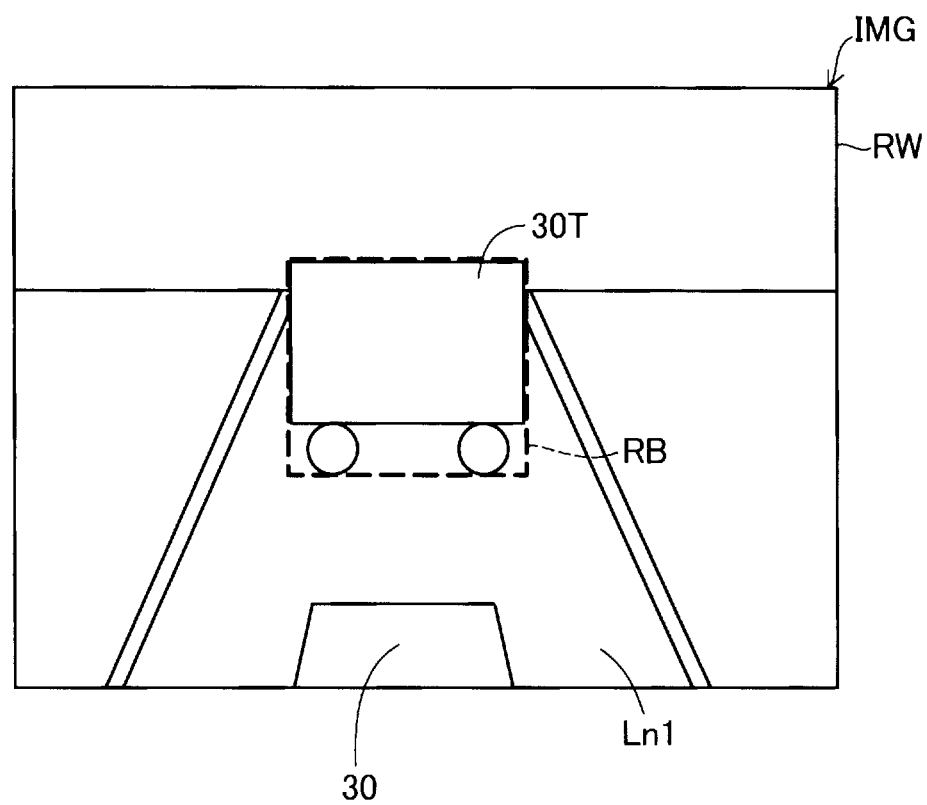
FIG. 3 is a diagram illustrating a determination method performed by a dead angle determination unit.

FIG. 3 schematically illustrates a captured image IMG ahead of the own vehicle 30 which is captured by the image sensor 14. The captured image IMG includes a preceding vehicle 30T running ahead of the own vehicle 30 in a traffic lane Ln1. According to the present embodiment, the dead angle determination unit 23 determines a presence of the dead angle region when a ratio R1 (%) which is a ratio of the number of pixels in an image showing the preceding vehicle 30T to the number of pixels of the whole captured image IMG is a predetermined first threshold or more. The first threshold is set to be 1%, for example. Note that the first threshold is not limited to 1%, but may be other value such as a value larger than 1%. The ratio R1 is defined using the following equation (1).

$$R1 = (RB/RW) \times 100 \qquad (1),$$

where RW refers to whole region (the number of total pixels) of the captured image IMG, and RB refers to an image region expressing the preceding vehicle 30T. According to the present embodiment, the image region RB is defined as a rectangular shaped region that surrounds an outer periphery of the preceding vehicle 30T in the captured image IMG. In other embodiments, the image region RB may be defined as a region surrounded by an outer periphery of the preceding vehicle 30T in the captured image IMG. In the case where a plurality of preceding vehicles are present, the image region RB is defined as a sum of the imaging regions of respective preceding vehicles 30T.

As described, the dead angle determination unit 23 can readily determine whether a dead angle region is present by using the captured image IMG, and the preceding vehicle 30T in the captured image IMG.

Figure 4:
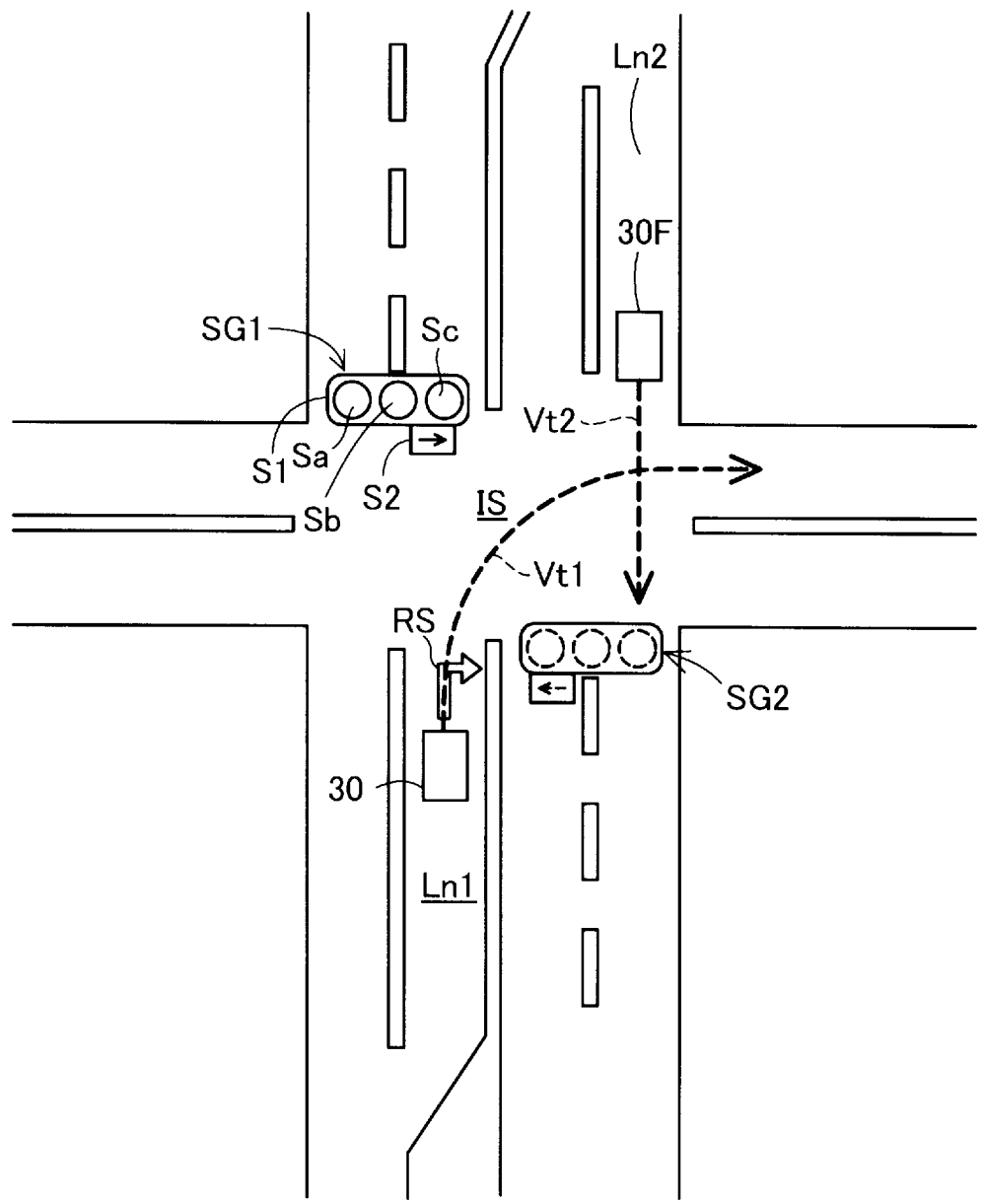
FIG. 4 is a diagram showing a road including an intersection according to the first embodiment.

As shown in FIG. 4, the priority travel determination unit 25 determines, based on a signal of a vehicle traffic signal SG1 (hereinafter referred to traffic signal SG1) installed in the intersection IS and located ahead of the own vehicle 30, whether or not a travelling of a right turn or a left turn of the own vehicle 30 is prioritized to the travelling of a straight-running vehicle 30F running on the opposite lane Ln2. In FIG. 4, an estimated running locus Vt1 of the own vehicle 30 and an estimated running locus Vt2 of the straight-running vehicle 30F are shown with dotted lines.

The traffic signal SG1 includes a main signal S1 and an auxiliary signal S2. Either one of three types of signals Sa, Sb and Sc in the main signal S1 turns ON sequentially in time, thereby notifying the driver of a permission of travel, a stop instruction or the like. For example, the signal Sa indicates a green signal, the signal Sb indicates a yellow signal and the signa Sc indicates a red signal. The auxiliary signal S2 turns an arrow ON, thereby prioritizing the travel of the own vehicle 30 running towards an arrow direction (right turn in this example, or left turn) as a direction where the own vehicle 30 cuts across the opposite lane Ln2 at the intersection, against a travel of other vehicle (e.g., straight-running vehicle 30F). According to the present embodiment, the right arrow turns green at a predetermined timing, thereby prioritizing the travel (i.e., right turn) of the own vehicle 30 cutting across the opposite lane Ln2 at the intersection IS against the travel of the straight-running vehicle 30F. In other words, the traffic lane Ln1 is a lane that allows vehicles to make a right turn only (i.e., right-turn exclusive lane), and when the auxiliary signal S2 turn ON, generally, a red signal lamp indicating a stop instruction has turned ON in the traffic signal SG2 installed on the opposite lane Ln2 at the intersection IS.

The priority travel determination unit 25 (FIG. 1) determines whether the auxiliary signal S2 of the traffic signal SG1 is ON or not based on the captured image ahead of the own vehicle which is captured by the image sensor 14. The priority travel determination unit 25 determines, when the auxiliary signal S2 is ON, that the traveling (i.e., right turn or left turn) of the own vehicle is prioritized over the travel of the straight-running vehicle 30F. On the other hand, the priority travel determination unit 25 determines, when the auxiliary signal S2 is OFF, that the traveling (i.e., right turn or left turn) of the own vehicle is not prioritized to the travel of the straight-running vehicle 30F.

The lane determination unit 26 determines whether the traffic lane Ln1 where the own vehicle 30 runs is a lane that allows vehicles to make only a right turn, or only a left turn. Specifically, the lane determination unit 26 performs a pattern matching process for the image ahead of the own vehicle 30 captured by the image sensor 14. Then, the lane determination unit 26 determines that the traffic lane Ln1 is a right-turn exclusive lane when determined that the road surface sign RS (FIG. 4) on the traffic lane Ln1 indicates a right turn permission, and determines that the traffic lane Ln1 is a left-turn exclusive lane when determined that the road surface sign RS (FIG. 4) on the traffic lane Ln1 indicates a left turn permission. According to the present embodiment, it is determined whether or not the traffic lane where the own vehicle 30 runs is a right-turn exclusive lane. According to other embodiments, the lane determination unit 26 may determine, by using other methods, whether the traffic lane Ln1 is a right-turn exclusive lane, or a left-turn exclusive lane. For example, the lane determination unit 26 may determine whether the traffic lane Ln1 is a right-turn exclusive lane or a left-turn exclusive lane, based on the current position of the own vehicle 30 in accordance with a GPS receiver and map data including types of the road surface sign RS.

The right-left turn determination unit 27 (FIG. 1) determines whether the own vehicle 30 cuts across the opposite lane Ln2 at the intersection IS to make a right turn or a left turn. According to the present embodiment, the right-left turn determination unit 27 determines, based on a state of the turn signal (not shown) of the own vehicle 30 as a result of operation of the turn signal by the driver, whether or not the own vehicle 30 makes a right turn. In other embodiments, the right-left turn determination unit 27 may determine, based on detection result of the yaw rate sensor 18 and the steering angle sensor 19, whether the own vehicle 30 makes a right turn or a left turn.

The collision avoidance control unit 28, when the dead angle determination unit 23 determines presence of the dead angle region, relaxes the operational condition of the collision avoidance process, i.e. makes the collision avoidance process more likely to be performed, compared to a case where the dead angle region is not present, in order to avoid collision between the own vehicle 30 and the straight-running vehicle 30F. The collision avoidance process is executed when an operation condition is met to avoid a collision between the own vehicle 30 and the straight-running vehicle 30F. The collision avoidance process includes a process automatically activating the brake 40, a process automatically operating the steering 42 so as to change a travelling direction of the own vehicle 30, a process for issuing an alert by the alert apparatus 44, or the like.

The operational condition is stored in an operation condition table 291 (control table) in the memory unit 29 (FIGS. 1 and 5). The operational condition table 291 (FIG. 5) includes operational conditions of the collision avoidance process corresponding to a case where it is determined that a dead angle region is present and a case where it is determined that a dead angle region is not present. As an operational condition of the collision avoidance process, when it is determined that a dead angle region is not present, a normal operational condition is used, and when it is determined that a dead angle region is present, a relaxed operational condition in which the operational condition is relaxed compared to the normal operational condition. The operational condition is composed of conditions 1 to 4 and the collision avoidance process is executed when all of four conditions are satisfied.

The condition 1 is defined based on a collision margin time (i.e., TTC: time to collision). The TTC refers to a time at which the relative distance between the own vehicle 30 and the straight-running vehicle 30F becomes zero. The TTC is calculated by the ECU 20 using a known method. The condition 2 is defined based on a relative distance D. The relative distance D refers to a distance between the own vehicle 30 and the straight-running vehicle 30F (i.e., longitudinal relative distance Da, lateral relative distance Db). The condition 3 is defined based on an estimated position P. The estimated position P is defined as an estimated position of collision where the straight-running vehicle 30F will collide with the own vehicle 30, which is estimated based on an estimated running locus of the straight-running vehicle 30F and an estimated running locus of the own vehicle 30. The estimated position is estimated by the ECU 20. The estimated running locus of the straight-running vehicle 30F is estimated based on a travelling direction and a traveling speed of the straight-running vehicle 30F which are estimated by using detection results of the millimeter wave radar 12 and the image sensor 14. The estimated running locus of the own vehicle 30 is estimated based on the travelling direction and the traveling speed of the own vehicle 30 which are calculated by using the detection results of the vehicle speed sensor 16, the yaw rate sensor 18 and the steering angle sensor 19. The condition 4 is defined by a sensor reliability SR. The sensor reliability SR is defined in accordance with the number of various sensors for detecting objects around the own vehicle 30 (i.e., straight-running vehicle 30F). The various sensors are the millimeter wave radar 12 and the image sensor 14, according to the present embodiment. In other embodiments, the sensor reliability SR may be defined with the above-described conditions 1 to 3 corresponding to the TTC, the relative distance D and the estimated position P which are calculated at predetermined intervals (e.g., every 50 msec) such that the number of consecutively satisfied conditions is used to define the sensor reliability SR. For example, the number of satisfied conditions is defined as a first number when a dead angle region is present (e.g., 5 times), and as a second number larger than the first number when a dead angle region is not present (e.g., 10 times).

Each of the conditions 1 to 4 is set to use a relaxed condition when a dead angle region is present, so that the operational condition is relaxed when the dead angle region is present, compared to a case where the dead angle region is not present. Specifically, the condition 1 is set such that a threshold of TTC is set to be time T2 when a dead angle region is not present, and is set to be a time T1 which is longer than the time T2 when a dead angle region is present. For the condition 2, the relative distance D is set such that the relative longitudinal distance Da is set to be a distance Da2, the relative lateral distance Db is set to be a distance Db2, when a dead angle region is not present, but the relative longitudinal distance is set to be a distance Da1 which is longer than the distance Da2. For the condition 3, a region of the estimated position P satisfying the condition 3 is set to be a region PR2 when a dead angle region is not present, and is set to be a region PR1 larger than the region PR2 when a dead angle region is present. The region PR2 is set to be a region (own vehicle region) where the own vehicle 30 is located, for example. The region PR2 is set including an own vehicle region and having an area larger than the own vehicle region, for example. The number of sensors (condition 4) that detect the straight-running vehicle 30F, in order to determine whether each of the conditions 1 to 3 is satisfied or not, is set to be two (millimeter wave radar 12 and image sensor 14) when a dead angle region is not present, and set to be one (either millimeter wave radar 12 or image sensor 14).

Note that the operational condition is defined as four conditions 1 to 4 according to the first embodiment, but it is not limited thereto. For example, according to other embodiments, the operational condition may be defined as a combination of at least one condition among the conditions 1 to 3 and the condition 4. Also, according to the first embodiment, relaxation of the operational condition is applied to each of the conditions 1 to 4. However, relaxation of the operational condition is not limited thereto. For example, in other embodiments, at least one of the conditions 1 to 4 may be relaxed. Specifically, the operational condition may be relaxed by changing only condition 1, for example.

The collision avoidance control unit 28 refers to a collision avoidance table 293 (FIG. 6) stored in the memory unit 29 and executes a collision avoidance process when the operational condition is satisfied. The collision avoidance table 293 includes contents of the collision avoidance process in the case where the normal operational condition or the relaxed operational condition is used. In the collision avoidance table 293, a content is defined such that a level of the collision avoidance process when the operational condition is relaxed (i.e., with relaxed operational condition) is higher than that of a case where the operational condition is not relaxed (i.e., with normal operational condition). According to the present embodiment, a process performing an automatic activation of the brake 40 is executed as a collision avoidance process when the normal operational condition is used, and an alert is issued by the alert apparatus 44 in addition to the process performing the automatic activation of the brake 40 when the relaxed operational condition is used. In other words, according to the present embodiment, when the relaxed operational condition is used, the number of types of collision avoidance process is larger than that of a case where the normal operational condition used, whereby the level of the collision avoidance process is set to be high. In other embodiments, when a relaxed operational condition is used, level of each process in the collision avoidance processes (e.g., braking force of the brake 40, output value of the alert apparatus 44) may be larger than that of a case where the normal operational condition used. Thus, the collision avoidance control unit 28 can further reduce a probability of collision where the own vehicle 30 collides with the straight-running vehicle 30F, by increasing the level of the collision avoidance process when the relaxed operational condition is used, compared to case where the normal operational condition is used.

The flowchart for setting an operational condition of a process executed by the on-vehicle system 10 as shown in FIG. 7 is repeatedly executed at a predetermined period. Note that the execution of the flowchart is triggered when the ignition switch of the own vehicle 30 turns ON.

First, the intersection determining unit 21 determines whether or not an intersection IS is present ahead of the own vehicle 30 (step S10). When it is determined that the intersection IS is not present, the process terminates the procedure. When it is determined that an intersection IS is present, the right-left turn determination unit 27 determines whether the own vehicle 40 will cut across the opposite lane Ln2 to make a right turn at the intersection IS (step S12). When it is determined at step S12 that the own vehicle 30 will not make a right turn, the process terminates the procedure. When it is determined at step S12 that the own vehicle 30 will make a right turn, the process executes step S14. At step S14, the collision avoidance control unit 28 determines whether the traffic lane Ln1 is a right-turn exclusive lane that allows vehicles to make only a right turn and the priority travel determination unit 25 determines whether the travelling of the own vehicle 30 making a right turn is prioritized against the travelling of the straight-running vehicle 30F (step S14). When it is determined that the traffic lane Ln is a right-turn exclusive lane, and the travelling of the own vehicle 30 making the right turn is prioritized against the straight-running vehicle (step S14: YES), the collision avoidance control unit 28 sets the operational condition to be a normal operational condition without a dead angle region, without relaxing the operational condition of the collision avoidance process (Step S16). In other words, when the determination at step S14 is YES, the collision avoidance control unit 28 uses, regardless of a determination result whether a dead angle region is present or not, the normal operational condition of a case where it is determined that no dead angle region is present, to be an operational condition of the collision avoidance process. When the determination at step S14 is YES, the straight-running vehicle 30F is unlikely to enter the intersection IS, regardless of a determination whether or not the dead angle region is present. Hence, when the determination at step S14 is YES, the normal operational condition is used so that activation of unnecessary collision avoidance process can be reduced.

When determining at least either a case where the lane determination unit 26 determines that the traffic lane Ln is not the right-turn exclusive lane, or a case where the priority travel determination unit 25 determines that the travelling of the own vehicle 30 making a right turn is not prioritized (step S14:NO), a process at step S18 is executed. In step S18, the dead angle determination unit 23 determines whether a dead angle region due to the preceding vehicle 30T is present or not. When the dead angle determination unit 23 determines that a dead angle region is present, the collision avoidance control unit 28 uses a relaxed operational condition as an operational condition of the collision avoidance process (step S20). On the other hand, the dead angle determination unit 23 determines at step S18, that no dead angle region is present, the collision avoidance control unit 28 uses a normal operational condition as an operation condition of the collision avoidance process (step S22).

As described, according to the above-described first embodiment, in the on-vehicle system 10, when it is determined that a dead angle region due to the preceding vehicle 30T is present, an operational condition of the collision avoidance process is relaxed compared to a case where no dead angle region is determined. Thus, since a collision avoidance process can be executed considering a dead angle region, a probability of collision between the own vehicle 30 and the straight-running vehicle 30F can be reduced.

Second Embodiment

Figure 8:
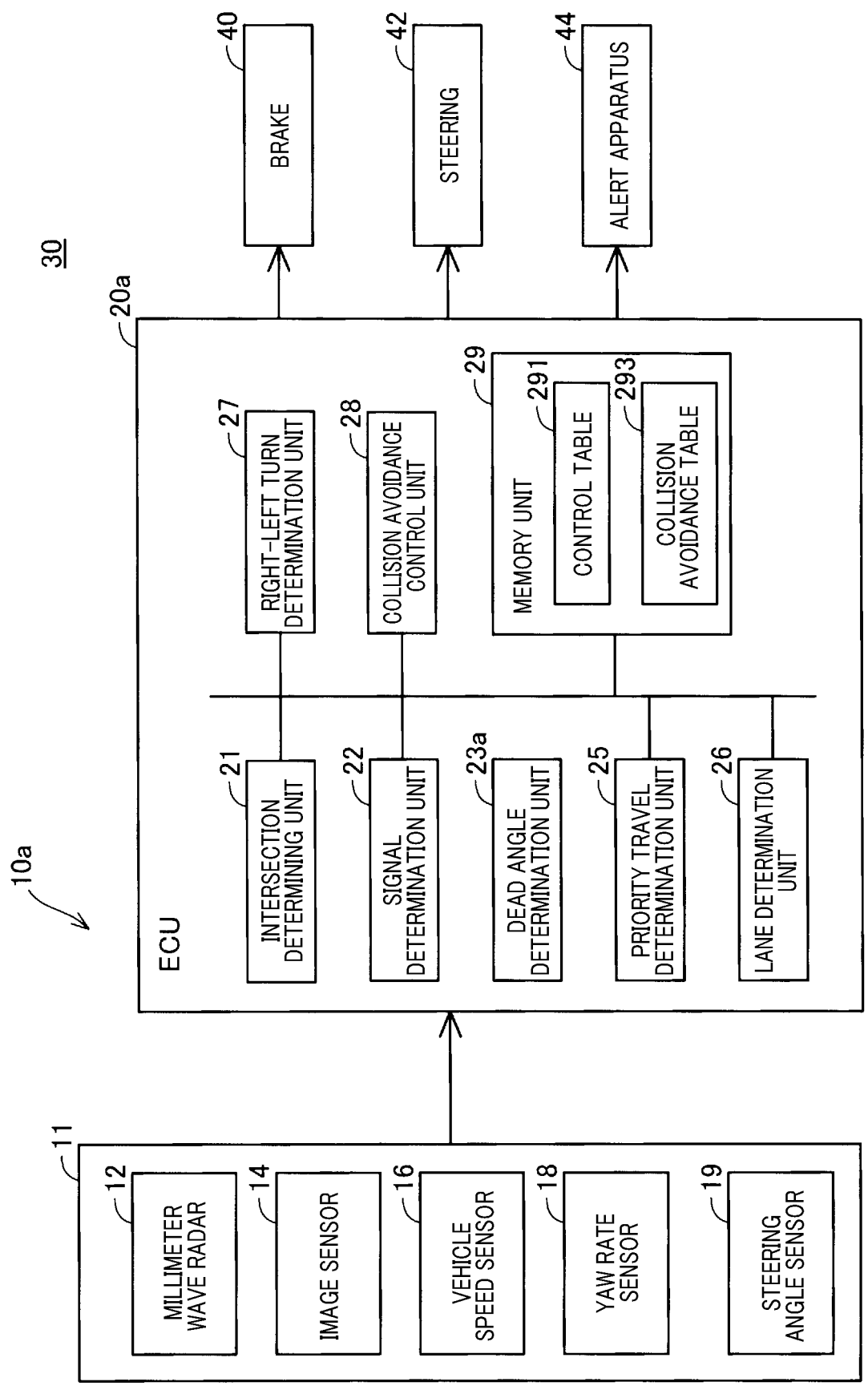
FIG. 8 is a block diagram showing an on-vehicle system according to a second embodiment.

With reference to FIG. 8, an on-vehicle system 10a of a second embodiment mounted to the own vehicle 30 will be described. The on-vehicle system 10a of the second embodiment differs from the on-vehicle system 10 of the above-described first embodiment (FIG. 1) in that the ECU 20 further includes a determination content of the dead angle determination unit 23a included in the ECU 20a, and a signal determination unit 22. Other configurations of the on-vehicle system 10a are similar to configurations of the on-vehicle system 10 of the first embodiment so that the same reference numbers are applied to the similar configurations and explanation thereof will be omitted.

Figure 9:
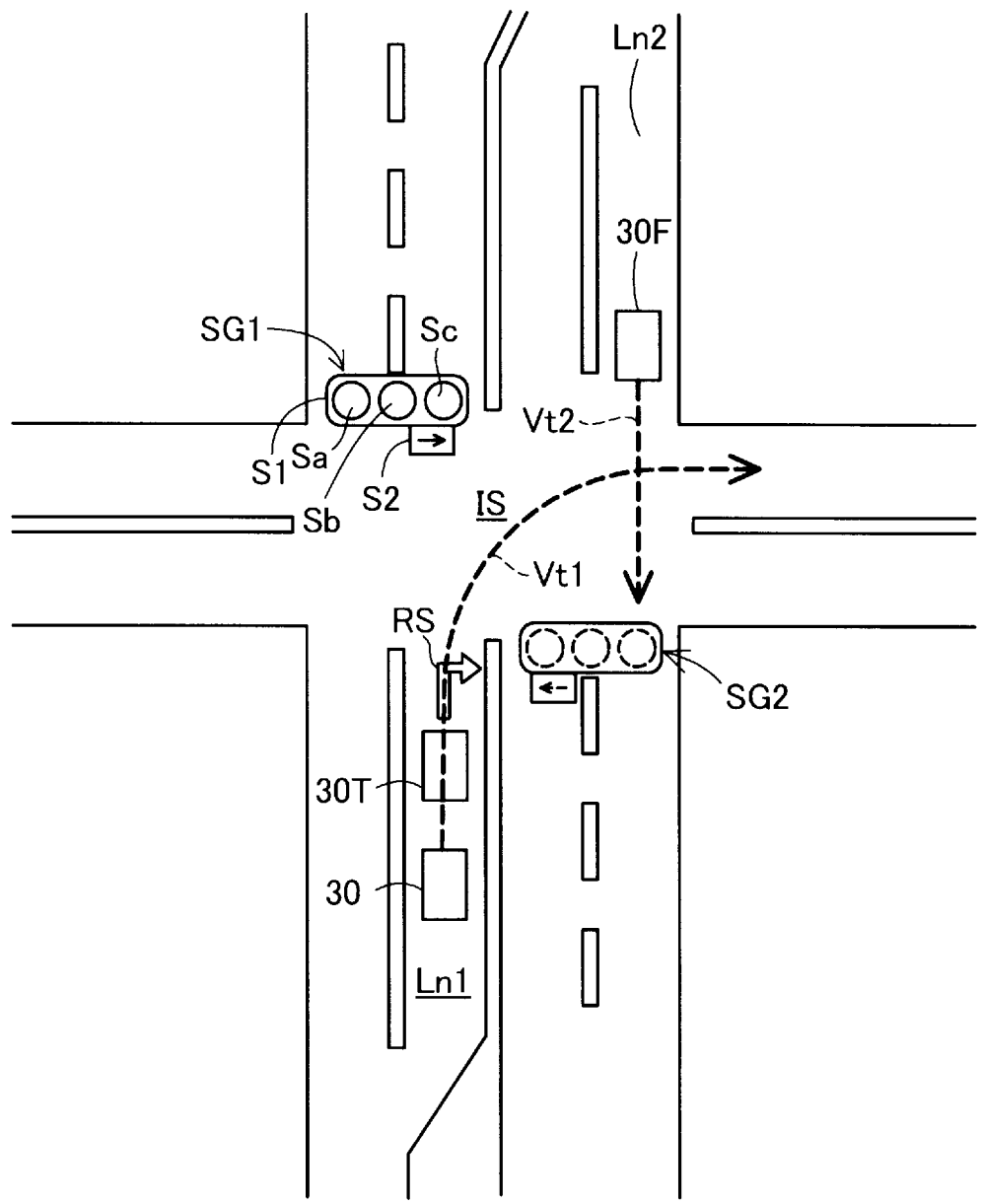
FIG. 9 is a diagram showing a road including an intersection according to the second embodiment.

As shown in FIG. 9, according to the on-vehicle system 10a, when the preceding vehicle 30T and the own vehicle 30 cut across the opposite lane Ln2 to make a right turn or left turn (i.e., right turn in the present embodiment), it is determined whether a dead angle region is present or not, and the process changes the operational condition depending on presence or absence of a dad angle region. Note that the preceding vehicle 30T is a vehicle running immediately ahead of the own vehicle 30.

The signal determination unit 22 determines whether the traffic signal SG1 changes a state of the signal from an enabling signal that allows vehicles (e.g., own vehicle) running on the traffic lane Ln 1 to make a right turn (left turn) to a restrict signal that restricts the right turn or the left turn of the vehicles. Specifically, the signal determination unit 22 determines based on captured image ahead of the own vehicle 30 which is captured by the image sensor 14, according to the followings. That is, in the case where the traffic signal SG1 shows a yellow signal Sb which turns ON between the green signal Sa that allows the travelling and the red signal Sc that inhibits the travelling which turns ON in time sequence, the signal determination unit 22 determines a state where the enabling signal changes to the restrict signal. Also, the signal determination unit 22 detects, based on a plurality of captured images in which the image sensor 14 consecutively captures ahead of the own vehicle 30, a time at which the auxiliary signal S2 changes its state from lighting-on to lighting-off (switched time), and determines a state where the enabling signal changes to the restrict signal during a predetermined period (e.g., 1 second) from the switched time.

The dead angle determination unit 23a determines that a dead angle region is present when the own vehicle 30 subsequently to the preceding vehicle 30T cuts across the opposite lane Ln2 to make a right turn or a left turn at the intersection IS, and the signal determination unit 22 determines a state where the enabling signal changes to the restrict signal. Specifically, the dead angle region 23a performs a determination in accordance with the followings, when the right-left turn determination unit 27 determines that the own vehicle 30 will make a right turn or a left turn. That is, when a relative distance between the own vehicle and the preceding vehicle 30T is within a certain area for a predetermined determination period, it is determined that the own vehicle 30 subsequently to the preceding vehicle 30T cuts across the opposite lane Ln2 to make a right turn or a left turn at the intersection IS. The predetermined determination period is 5 seconds or larger, for example. The certain area is defined such that the lateral relative distance between the own vehicle 30 and the preceding vehicle 30T is within ±2 meters and the longitudinal relative distance between the own vehicle 30 and the preceding vehicle 3-T is within 10 meters.

Figure 10:
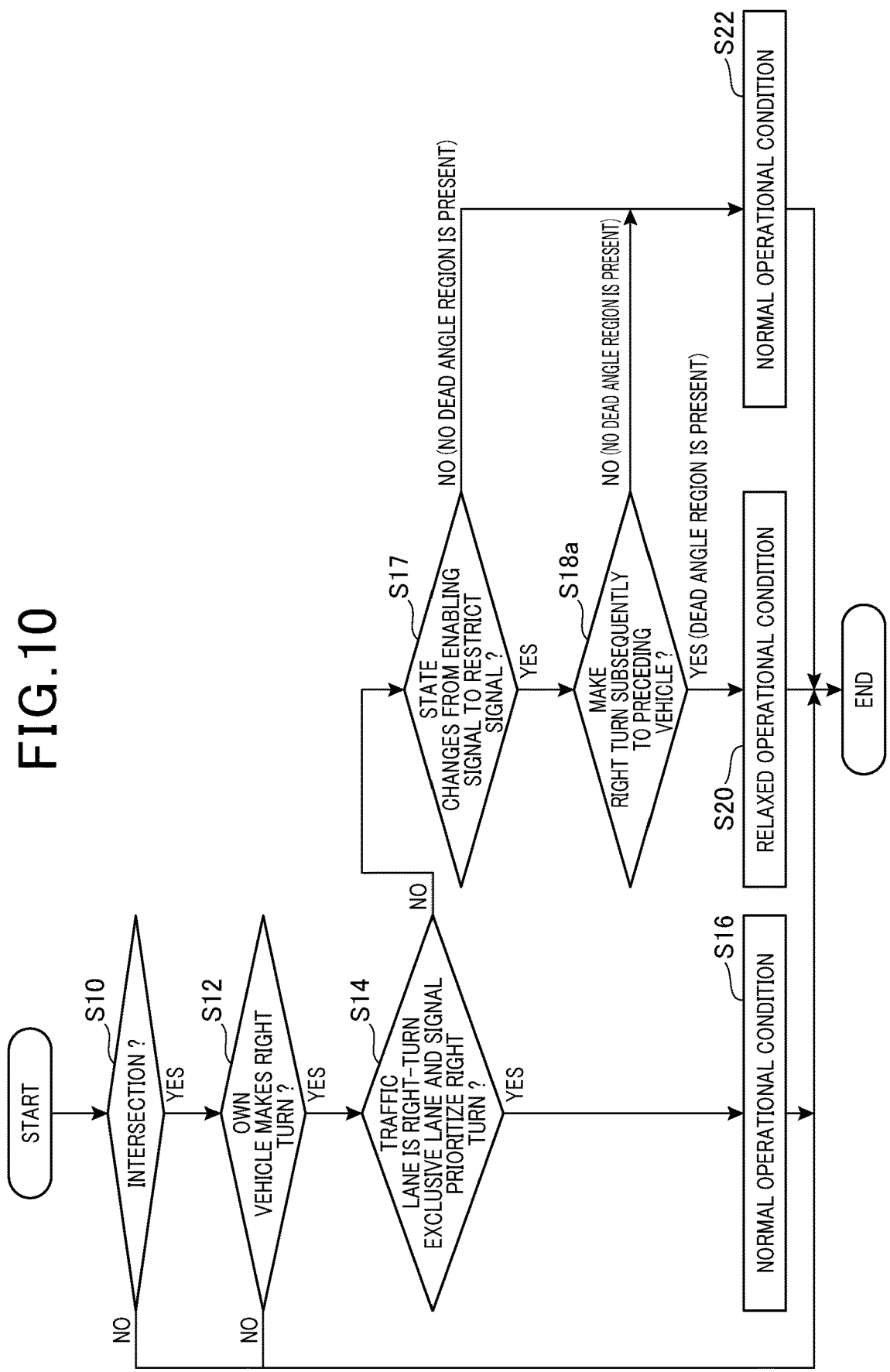
FIG. 10 is a flowchart for setting the operational conditions executed by an on-vehicle system.

Similar to the first embodiment, the flowchart for setting an operational condition of a process executed by the on-vehicle system 10 shown in FIG. 10 is repeatedly executed at a predetermined period. Note that the execution of the flowchart is triggered when the ignition switch of the own vehicle 30 turns ON. The difference between the flowchart of a process executed by the on-vehicle system 10a and the flow chart of a process executed by the on-vehicle system 10 (FIG. 7) is that contents of step (step S17, S18a) of process that determines whether a dead angle region is present or not, are different therebetween. Since other steps are the same as that of the first embodiment, the same reference numbers are applied to the same steps and explanation thereof will be omitted.

When the determination at step S14 is NO, the signal determination unit 22 determines whether the traffic signal SG1 changes the signal from the enabling signal that allows vehicles to make a right turn to the restrict signal that restrict the vehicle to restrict making right turn of the vehicles (step S17). When it is determined that the signal will not be changed from the enabling signal to the restrict signal (e.g., green signal Sa of the traffic signal SG1 is ON) (step S17: NO), the collision avoidance control unit 28 uses a normal operation condition as an operational condition of the collision avoidance process (step S22). On the other hand, when it is determined that the signal is changed from the enabling signal to the restrict signal (e.g., yellow signal Sb of the traffic signal is ON) (step S17: YES), the dead angle determination unit 23a determines whether the own vehicle 30 subsequently to the preceding vehicle 30T cuts across the opposite lane Ln2 to make a right turn at the intersection IS (step S18a). When it is determined that the own vehicle 30 subsequent to the preceding vehicle 30T is making a right turn (step S18a: YES), the collision avoidance control unit 28 uses a relaxed operational condition as an operational condition of the collision avoidance process (step S20). Meanwhile, when it is determined that the own vehicle 30 subsequently to the preceding vehicle 30T is not making a right turn (step S18a: NO), the collision avoidance control unit 28 uses a normal operational condition as an operational condition of the collision avoidance process (step S22). Thus, in the specific case where the determination at step S17 is YES and the determination at step S18a is YES, the dead angle determination unit 23a determines that the dead angle region is present and proceeds to step S20 similar to that of the first embodiment. On the other hand, at least either a determination at step S17 being YES, or a determination at step S18a being NO is satisfied, the dead angle determination unit 23a determines that no dead angle region is present and proceeds to step S22 similar to that of the first embodiment.

According to the second embodiment, similar effects and advantages to those of the first embodiment can be obtained according to the configurations similar to those of the first embodiment. Also, according to the second embodiment, the dead angle determination unit 23a can readily determine that the dead angle region is present, when a specific case is satisfied, where a determination at step S17 is YES and a determination ate step S18a is YES.

Third Embodiment

Figure 11:
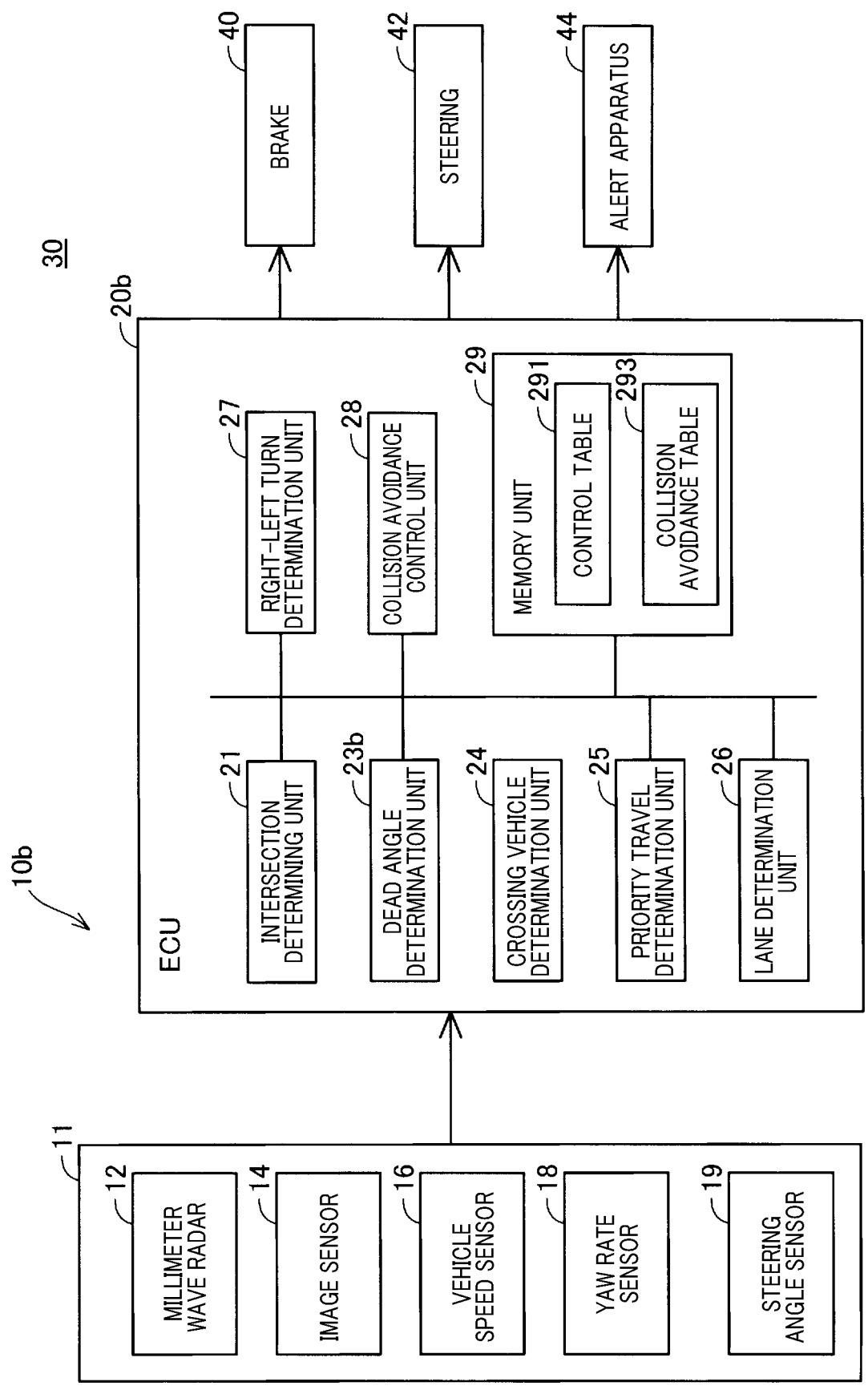
FIG. 11 is a block diagram showing an on-vehicle system according to a third embodiment.

With reference to FIG. 11, an on-vehicle system 10b according to the third embodiment mounted on the own vehicle 30 will be described. The on-vehicle system 10b according to the third embodiment differs from the on-vehicle system 10 according to the above-described first embodiment (FIG. 1) in that the ECU 20b further includes a crossing vehicle determination unit 24, and the contents of the dead angle determination unit 23b. Since other configurations of the on-vehicle system 10b are similar to those of the on-vehicle system 10 of the first embodiment, the same reference numbers are applied to similar configurations and the explanation thereof will be omitted.

Figure 12:
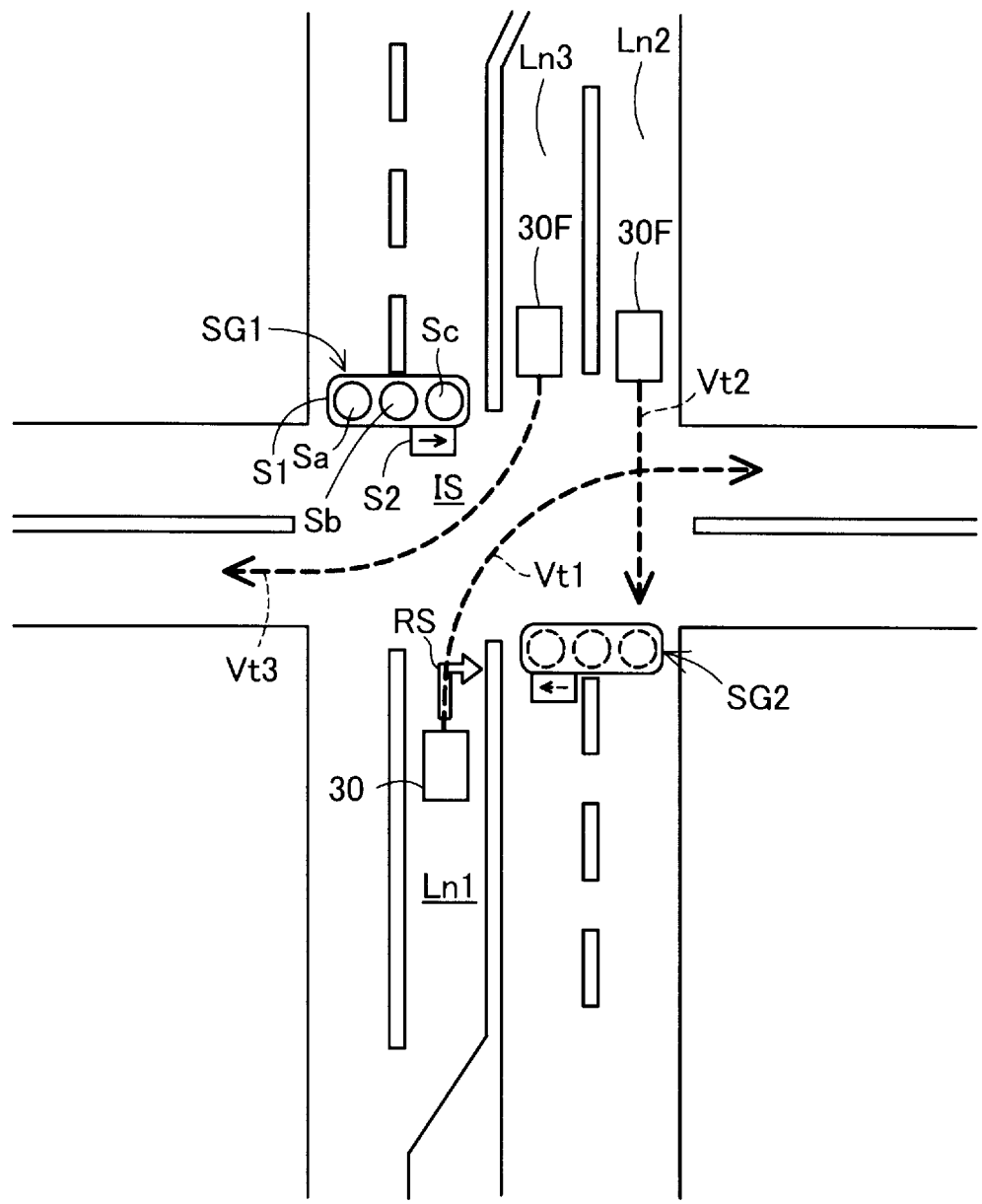
FIG. 12 a diagram showing a road including an intersection according to the third embodiment.

As shown in FIG. 12, the crossing vehicle determination unit 24 determines whether a crossing vehicle 30Y is present or not, the crossing vehicle 30Y cuting the traffic lane Ln1 of the own vehicle 30 to make a right turn or a left turn at the intersection IS. Specifically, detection results of the millimeter wave radar 12 and the image sensor 14 are acquired in a time series, thereby detecting a movement of a vehicle ahead of the own vehicle 30, running on the opposite lane Ln3. The crossing vehicle determination unit 24 determines that the vehicle is the crossing vehicle 30, when the movement of the detected vehicle is in a direction approaching the own vehicle 30 and the detected vehicle moves towards a left side direction at a predetermined travelling speed when viewed from the own vehicle 30. Note that the estimated running locus Vt1 of the own vehicle 30, the estimated running locus Vt2 of the straight-running vehicle 30F, and the estimated running locus Vt3 of the crossing vehicle 30Y shown in FIG. 12 are indicated by dotted lines.

The dead angle determination unit 23b determines, based on the crossing vehicle 30Y that cuts across the traffic lane Ln1 of the own vehicle 30 from the opposite lane Ln3 to make a right turn or a left turn at the intersection IS, whether a dead angle region is present or not. Specifically, similar to the dead angle determination unit 23, the dead angle determination unit 23b determines a presence of the dead angle region when a ratio (%) which is a ratio of the number of pixels in an image showing the crossing vehicle 30Y to the number of pixels of the whole captured image IMG is a predetermined first threshold or more. That is, according to the dead angle determination unit 23b, the image region (the number of pixels) of the crossing vehicle 30Y replaces the image region RB of the preceding vehicle 30T expressed in the above-described equation (1) to calculate the ratio R1. Note that, when a plurality of crossing vehicles 30Y are present, the image region RB is defined as a sum of the image regions of respective crossing vehicles 30Y.

Figure 13:
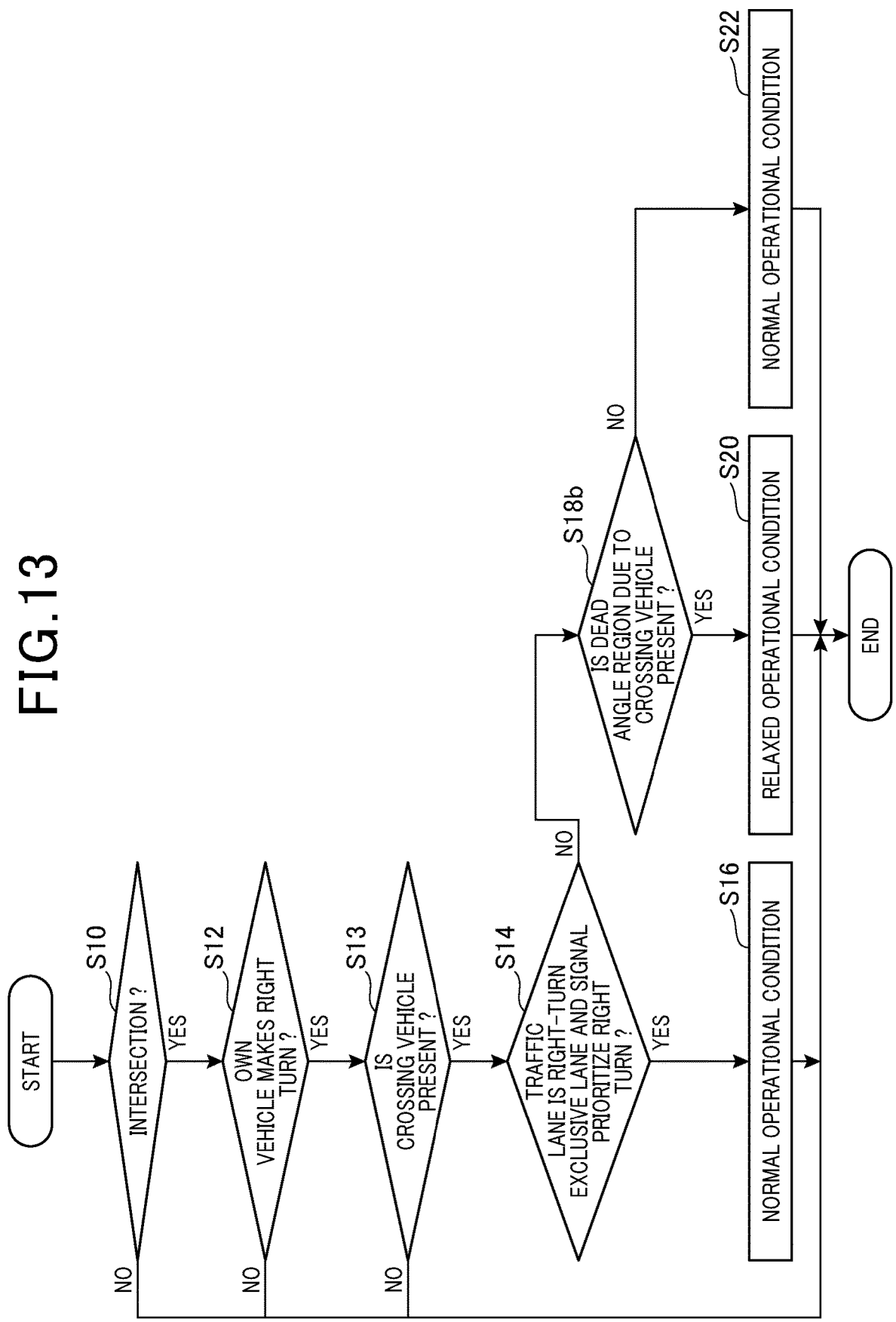
FIG. 13 is a flowchart for setting the operational conditions executed by an on-vehicle system.

Similar to the first embodiment, the flowchart for setting an operational condition of a process executed by the on-vehicle system 10b shown in FIG. 13 is repeatedly executed at a predetermined period. Note that the execution of the flowchart is triggered when the ignition switch of the own vehicle 30 turns ON. The difference between the flowchart of a process executed by the on-vehicle system 10b and the flow chart of a process executed by the on-vehicle system 10 (FIG. 7) is that step S13 is newly added to the flowchart in the on-vehicle system 10b and contents of step S18b which performs whether or not a dead angle region is present. Since other steps are the same as that of the first embodiment, the same reference numbers are applied to the same steps and explanation thereof will be omitted.

When the determination at step S12 is YES, the crossing vehicle determination unit 24 determines whether a crossing vehicle 30Y is present, the crossing vehicle cuting the traffic lane Ln1 of the own vehicle 30 to make a right turn (step S13). When it is determined that no crossing vehicle 30Y is present at step S13, the process terminates the procedure. When it is determined that a crossing vehicle is present at step S13, step S14 is executed. When the determination at step S14 is NO, step S18b is executed. At step S18b, the dead angle determination unit 23b determines whether a dead angle region caused by the crossing vehicle 30Y is present. When the dead angle determination unit 23b determines that a dead angle region is present, the collision avoidance control unit 28 uses a relaxed operational condition as an operational condition of a collision avoidance process (step S20). On the other hand, at step S18b, when the dead angle determination unit 23b determines that no dead angle region is present, the collision avoidance control unit 28 uses a normal operational condition as an operational condition of a collision avoidance process (step S22).

According to the above-described third embodiment, similar effects and advantages to those of the first embodiment can be obtained according to the configurations similar to those of the first embodiment. According to the third embodiment, in the on-vehicle system 10b, when it is determined that a dead angle region caused by the crossing vehicle 30 Y is present, the operational condition of the collision avoidance process is relaxed compared to a case where no dead angle region is present. Thus, a collision avoidance process can be performed considering a dead angle region so that a probability of collision between the own vehicle 30 and the straight-running vehicle 30F can be reduced.

OTHER EMBODIMENTS

First Other Embodiment

Figure 14:
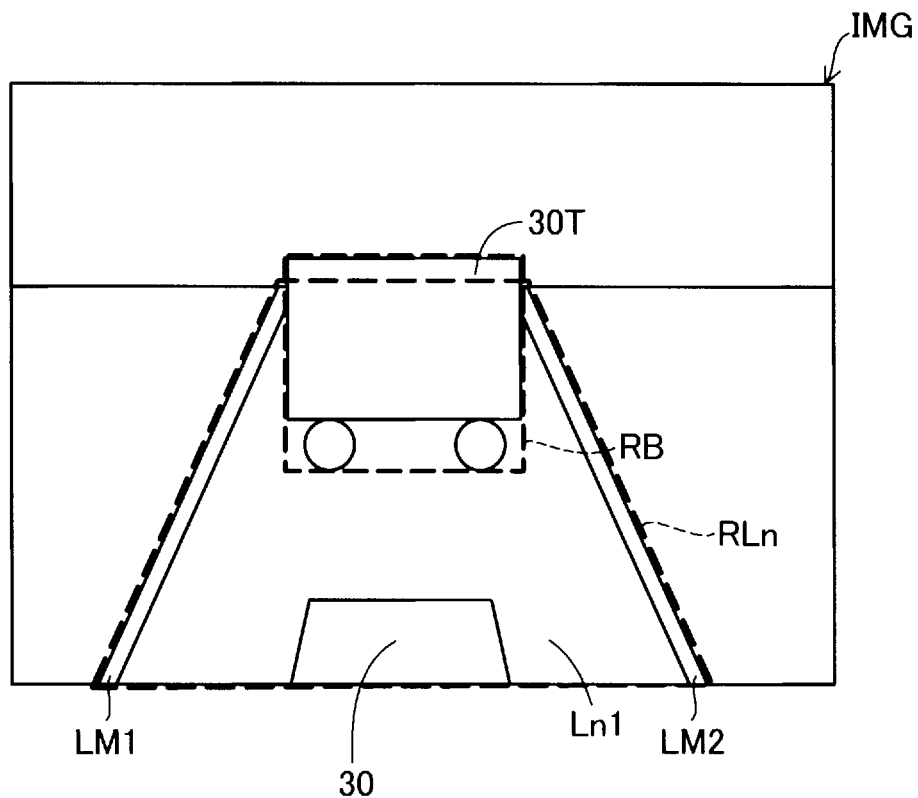
FIG. 14 is a diagram showing a first other embodiment.

According to the first and third embodiments, the dead angle determination units 23 and 23b determines whether or not a dead angle region is present by using the above-described equation (1). However, this is not limited thereto. With reference to FIG. 14, other determinations whether a dead angle region is present, which are executed by the angle determination units 23 and 23b will be described as follows. The dead angle determination units 23 and 23b may determine that a dead angle region is present, when the ratio R2 (%) calculated using below equation (2) in the captured image IMG ahead of the own vehicle 30 captured by the image sensor 14, is a predetermined second threshold or more. The second threshold is set to be 2%, for example. Note that the threshold is not limited to 2% but may be other value (e.g., value larger than 2%).

$$R2=(RB/RLn)\times 100 \qquad (2),$$

Here, RLn is an image region (the number of pixels) of an image expressing the traffic lane Ln1 in the captured image IMG, and RB is an image region (the number of pixels) of an image expressing the preceding vehicle 30T. According to the present embodiment, the image region RLn is defined as a rectangular area surrounded by outer edge of both markings LM1, LM2 which defines the traffic lane Ln1, a line connecting one ends of the markings LM1 and LM2, and a line connecting other ends of the markings LM1 and LM2. The image region RB is defined as a rectangular region surrounding an outer edge of the preceding vehicle 30T in the captured image IMG, when determining a dead angle region caused by the preceding vehicle 30T similar to a case using the above-described equation (1). In other embodiments, the image region RB may be defined as a region surrounded by an outer edge of the preceding vehicle 30T in the captured image IMG. In the case where a plurality of preceding vehicles 30T are present, the image region RB is a sum of image regions of respective preceding vehicles 30T. Also, when determining a dead angle region caused by the crossing vehicle 30Y, the image region RB is an image region (the number of pixels) expressing an image of the crossing vehicle 30Y.

According to the first other embodiment, a dead angle region can readily be determined based on a ratio of the number of pixels of an image of the preceding vehicle 30T or the crossing vehicle 30Y to the number of pixels of an image expressing the traffic lane Ln1 in the captured image IMG.

Second Other Embodiment

Figure 15:
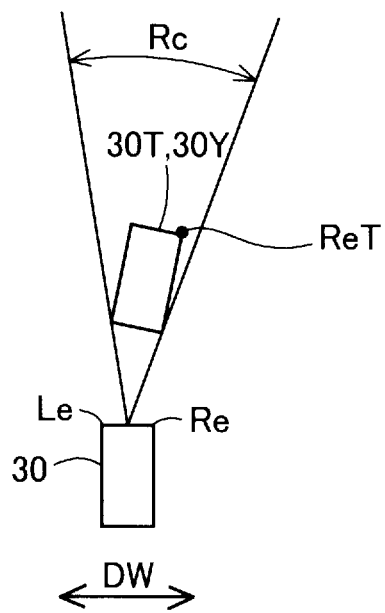
FIG. 15 is a diagram showing a second other embodiment.

The dead angle determination unit 23, 23b may determine whether a dead angle region is present by using a method (described as follows) instead of the method of the first other embodiment. With reference to FIG. 15, detail determination method of whether a dead angle region is present or not will be described. As shown in FIG. 15, the dead angle region determination units 23, 23b estimates an image of the own vehicle 30, and the preceding vehicle 30T or the crossing vehicle 30Y when viewed from the above, based on the captured image IMG ahead of the own vehicle which is captured by the image sensor 14.

In the case where the own vehicle 30 cuts across the opposite lane Ln2 to make a right turn at the intersection IS, the dead angle determination unit 23, 23b determines that a dead angle region is present when the following condition A is satisfied.

<Condition A>

A right end portion ReT of the preceding vehicle 30T or the crossing vehicle 30Y is located closer to the right end portion Re of the own vehicle 30 than to the left end portion Le of the own vehicle 30 with respect to the width direction DW of the own vehicle 30, and an angle range Rc is the third threshold or more, the angle range covering the preceding vehicle 30T or the crossing vehicle 30Y in a horizontal direction with respect to the own vehicle 30 (i.e., a position of the image sensor 14) as the center of the angle range Rc.

In the above-condition A, the third threshold is set to be a value capable of being used for estimating a presence of dead angle region. For example, the third threshold may be set to 5.7 degrees or other values. Here, according to the condition A, in the case where the right end portion ReT of the preceding vehicle 30T or the crossing vehicle 30Y is closer to the left end portion Le of the own vehicle 30 than to the right end portion Re of the own vehicle 30, the process can determine that a probability in which no dead angle region is present is high. Thus, this case is excluded from the requirement of the condition A regardless of an angle range.

Figure 16:
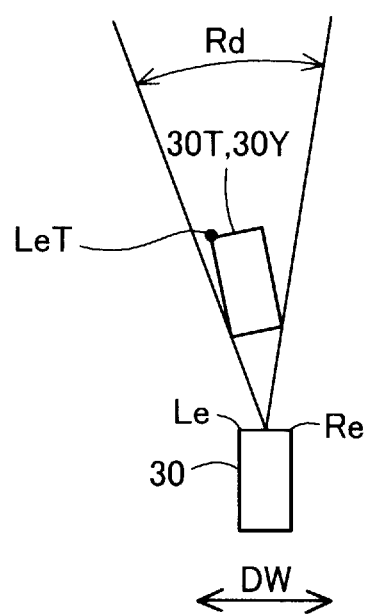
FIG. 16 is a diagram showing a second other embodiment.

Also, as shown in FIG. 16, in the case where the own vehicle 30 cuts across the opposite lane Ln2 to make a left turn at the intersection IS, the dead angle determination unit 23, 23b determines that a dead angle region is present when the following condition B is satisfied.

<Condition B>

A left end portion LeT of the preceding vehicle 30T or the crossing vehicle 30Y is located closer to the left end portion Le of the own vehicle 30 than to the right end portion Re of the own vehicle 30 with respect to the width direction DW of the own vehicle 30, and an angle range Rd is the fourth threshold or more, the angle range covering the preceding vehicle 30T or the crossing vehicle 30Y in a horizontal direction with respect to the own vehicle 30 (i.e., a position of the image sensor 14) as the center of the angle range Rd.

In the above-condition B, the fourth threshold is set to be a value capable of being used for estimating a presence of dead angle region. For example, the fourth threshold may be set to 5.7 degrees or other values. Here, according to the condition B, in the case where the left end portion LeT of the preceding vehicle 30T or the crossing vehicle 30Y is closer to the right end portion Re of the own vehicle 30 than to the left end portion Le of the own vehicle 30, the process can determine that probability in which no dead angle region is present is high. Hence, this case is excluded from the requirement of the condition B regardless of an angle range.

According to the above-described second other embodiment, whether or not a dead angle region is present can readily be determined based on the angle range covering the preceding vehicle 30T or the crossing vehicle 30Y with respect to the own vehicle 30 as the center of the angle range.

Third Other Embodiment

The operational condition can be determined by combining at least two embodiments in the above-described first to third embodiments. For example, a determination process (determination of whether a dead angle region is present or not) at step S18 shown in FIG. 7 in the first embodiment, and a determination process (determination of whether a dead angle region is present or not) at step S17 and step S18a shown in FIG. 10 in the second embodiment may be executed. When it is determined that a dead angle region is present with at least one determination whether a dead angle region is present or not, a relaxed operational condition as an operational condition is used.

Fourth Other Embodiment

According to the above-described embodiments, the collision avoidance control unit 28 changes a level of the collision avoidance process depending on cases where the relaxed condition is used or not used for the operational condition (FIG. 6). However, a level of the collision avoidance process may not be changed.

Fifth Other Embodiment

According to the above-described embodiments, on-vehicle systems 10, 10a and 10b for a left-hand traffic are described. However, the on-vehicle systems 10, 10a and 10b can be applied to a right-hand traffic.

The present disclosure is not limited to the above-described embodiments, examples, and modifications. The present disclosure can be accomplished by various configurations without departing from the spirit and scope of the present disclosure. For example, technical features of embodiments, examples and modifications corresponding to technical features described in the summary part of the present disclosure can be appropriately replaced or combined in order to solve a part or all of the above-mentioned issues or to achieve a part or all of the above-mentioned effects and advantages. Moreover, the technical features, when they are not described as necessary elements in the present specification, can be appropriately removed.

What is claimed is:

1. A collision avoidance apparatus mounted on an own vehicle comprising:
   one or more processors;
   a memory storing instructions that when executed by the one or more processors causes the collision avoidance apparatus to perform processes comprising:
   an intersection determining process that determines whether or not an intersection is present ahead of the own vehicle;
   a dead angle determination process that determines whether or not a dead angle region when viewed from the own vehicle is present in an opposite lane existing ahead of the own vehicle, based on at least either a preceding vehicle running ahead of the own vehicle or a crossing vehicle that cuts across a traffic lane of the own vehicle from the opposite lane to make a right turn or a left turn at the intersection;
   a right-left turn determination process that determines whether or not the own vehicle cuts across the opposite lane to make a right turn or a left turn at the intersection;
   a collision avoidance control process that, based on the right-left turn determination unit determining that the own vehicle makes a right turn or a left turn and the dead angle determination process determining presence of the dead angle region, relaxes an operational condition of a collision avoidance process compared to a case where the dead angle region is not present, in order to avoid a collision between the own vehicle and a straight-running vehicle running on the opposite lane;
   an image sensor that captures an area ahead of the own vehicle;
   wherein
   the dead angle determination process determines whether or not the dead angle region is present, based on (i) a captured image captured by the image sensor and (ii) at least either the preceding vehicle or the crossing vehicle in the captured image;
   in the case where the own vehicle cuts across the opposite lane to make a right turn at the intersection, the dead angle determination process determines that a dead angle region is present based on satisfying a condition where a right end portion of the preceding vehicle or the crossing vehicle is located closer to a right end portion of the own vehicle than to a left end portion of the own vehicle with respect to a width direction of the own vehicle, and an angle range is a third threshold or more, the angle range covering the preceding vehicle or the crossing vehicle in a horizontal direction with respect to the own vehicle as a center of the angle range; and
   in the case where the own vehicle cuts across the opposite lane to make a left turn at the intersection, the dead angle determination process determines that a dead angle region is present based on satisfying a condition where a left end portion of the preceding vehicle or the crossing vehicle is located closer to the left end portion of the own vehicle than to the right end portion of the own vehicle with respect to the width direction of the own vehicle, and an angle range is a fourth threshold or more, the angle range covering the preceding vehicle or the crossing vehicle in a horizontal direction with respect to the own vehicle as a center of the angle range.

2. The collision avoidance apparatus according to claim 1, wherein
   the dead angle determination process determines, in the captured image, a presence of the dead angle region, based on a ratio of the number of pixels in an image showing the preceding vehicle or the crossing vehicle to the number of pixels of a whole captured image being a predetermined first threshold or more.

3. The collision avoidance apparatus according to claim 1, wherein
   the dead angle determination process determines, in the captured image, a presence of the dead angle region, based on a ratio of the number of pixels in an image showing the preceding vehicle or the crossing vehicle to the number of pixels of an image showing the traffic lane being a predetermined second threshold or more.

4. The collision avoidance apparatus according to claim 1, wherein
   the apparatus further comprises a signal determination process that determines whether a traffic signal changes a state of a signal from an enabling signal that allows vehicles running on the traffic lane to make a right turn or a left turn to a restrict signal that restricts the right turn or the left turn of the vehicles, traffic signal being installed in the intersection and located ahead of the own vehicle; and
   the dead angle determination process determines that a dead angle region is present based on the own vehicle subsequently to the preceding vehicle cutting across the opposite lane to make a right turn or a left turn at the intersection, and the signal determination process determines a state where the enabling signal changes to the restrict signal.

5. A collision avoidance apparatus mounted on an own vehicle comprising:
   one or more processors;
   a memory storing instructions that when executed by the one or more processors causes the collision avoidance apparatus to perform processes comprising:
   an intersection determining process that determines whether or not an intersection is present ahead of the own vehicle;
   a dead angle determination process that determines whether or not a dead angle region when viewed from the own vehicle is present in an opposite lane existing ahead of the own vehicle, based on at least either a preceding vehicle running ahead of the own vehicle or a crossing vehicle that cuts across a traffic lane of the own vehicle from the opposite lane to make a right turn or a left turn at the intersection;

a right-left turn determination process that determines whether or not the own vehicle cuts across the opposite lane to make a right turn or a left turn at the intersection;

a collision avoidance control process that, based on the right-left turn determination unit determining that the own vehicle makes a right turn or a left turn and the dead angle determination process determining presence of the dead angle region, relaxes an operational condition of a collision avoidance process compared to a case where the dead angle region is not present, in order to avoid a collision between the own vehicle and a straight-running vehicle running on the opposite lane;

a priority travel determination process that determines, based on a signal of a traffic signal installed in the intersection and located ahead of the own vehicle, whether or not travelling of a right turn or a left turn of the own vehicle is prioritized to a travelling of the straight-running vehicle running on the opposite lane; and a lane determination process that determines whether the traffic lane of the own vehicle is a lane that allows vehicles to make only a right turn, or only a left turn; and wherein the collision avoidance control process uses, regardless of a determination result of whether a dead angle region is present or not, a normal operational condition of a case where it is determined that no dead angle region is present, to be an operational condition of the collision avoidance process, based on the lane determination process determining that the traffic lane of the own vehicle is a lane that allows vehicles to make only a right turn or to make only a left turn, and the priority travel determination process determines that a travelling of a right turn or a left turn of the own vehicle is prioritized to a travelling of the straight-running vehicle.

6. The collision avoidance apparatus according to claim 1, wherein
the collision avoidance control process increases a level of the collision avoidance process based on a relaxed operational condition being used as the operational condition, compared to case where the normal condition is used as the operational condition which is not relaxed condition.

7. The collision avoidance apparatus according to claim 5, wherein
the apparatus further comprises an image sensor that captures an area ahead of the own vehicle; and wherein
the dead angle determination process determines whether or not the dead angle region is present, based on (i) a captured image captured by the image sensor and (ii) at least either the preceding vehicle or the crossing vehicle in the captured image.

8. The collision avoidance apparatus according to claim 7, wherein
the dead angle determination process determines, in the captured image, a presence of the dead angle region, based on a ratio of the number of pixels in an image showing the preceding vehicle or the crossing vehicle to the number of pixels of a whole captured image being a predetermined first threshold or more.

9. The collision avoidance apparatus according to claim 7, wherein
the dead angle determination process determines, in the captured image, a presence of the dead angle region, based on a ratio of the number of pixels in an image showing the preceding vehicle or the crossing vehicle to the number of pixels of an image showing the traffic lane being a predetermined second threshold or more.

10. The collision avoidance apparatus according to claim 7, wherein
in the case where the own vehicle cuts across the opposite lane to make a right turn at the intersection, the dead angle determination process determines that a dead angle region is present based on satisfying a condition where a right end portion of the preceding vehicle or the crossing vehicle is located closer to a right end portion of the own vehicle than to a left end portion of the own vehicle with respect to a width direction of the own vehicle, and an angle range is a third threshold or more, the angle range covering the preceding vehicle or the crossing vehicle in a horizontal direction with respect to the own vehicle as a center of the angle range; and in the case where the own vehicle cuts across the opposite lane to make a left turn at the intersection, the dead angle determination process determines that a dead angle region is present based on satisfying a condition where a left end portion of the preceding vehicle or the crossing vehicle is located closer to the left end portion of the own vehicle than to the right end portion of the own vehicle with respect to the width direction of the own vehicle, and an angle range is a fourth threshold or more, the angle range covering the preceding vehicle or the crossing vehicle in a horizontal direction with respect to the own vehicle as a center of the angle range.

11. The collision avoidance apparatus according to claim 5, wherein
the apparatus further comprises a signal determination process that determines whether a traffic signal changes a state of a signal from an enabling signal that allows vehicles running on the traffic lane to make a right turn or a left turn to a restrict signal that restricts the right turn or the left turn of the vehicles, traffic signal being installed in the intersection and located ahead of the own vehicle; and the dead angle determination process determines that a dead angle region is present based on the own vehicle subsequently to the preceding vehicle cutting across the opposite lane to make a right turn or a left turn at the intersection, and the signal determination process determines a state where the enabling signal changes to the restrict signal.

12. The collision avoidance apparatus according to claim 5, wherein
the collision avoidance control process increases a level of the collision avoidance process based on a relaxed operational condition being used as the operational condition, compared to case where the normal condition is used as the operational condition which is not relaxed condition.

* * * * *